Patented Oct. 27, 1953

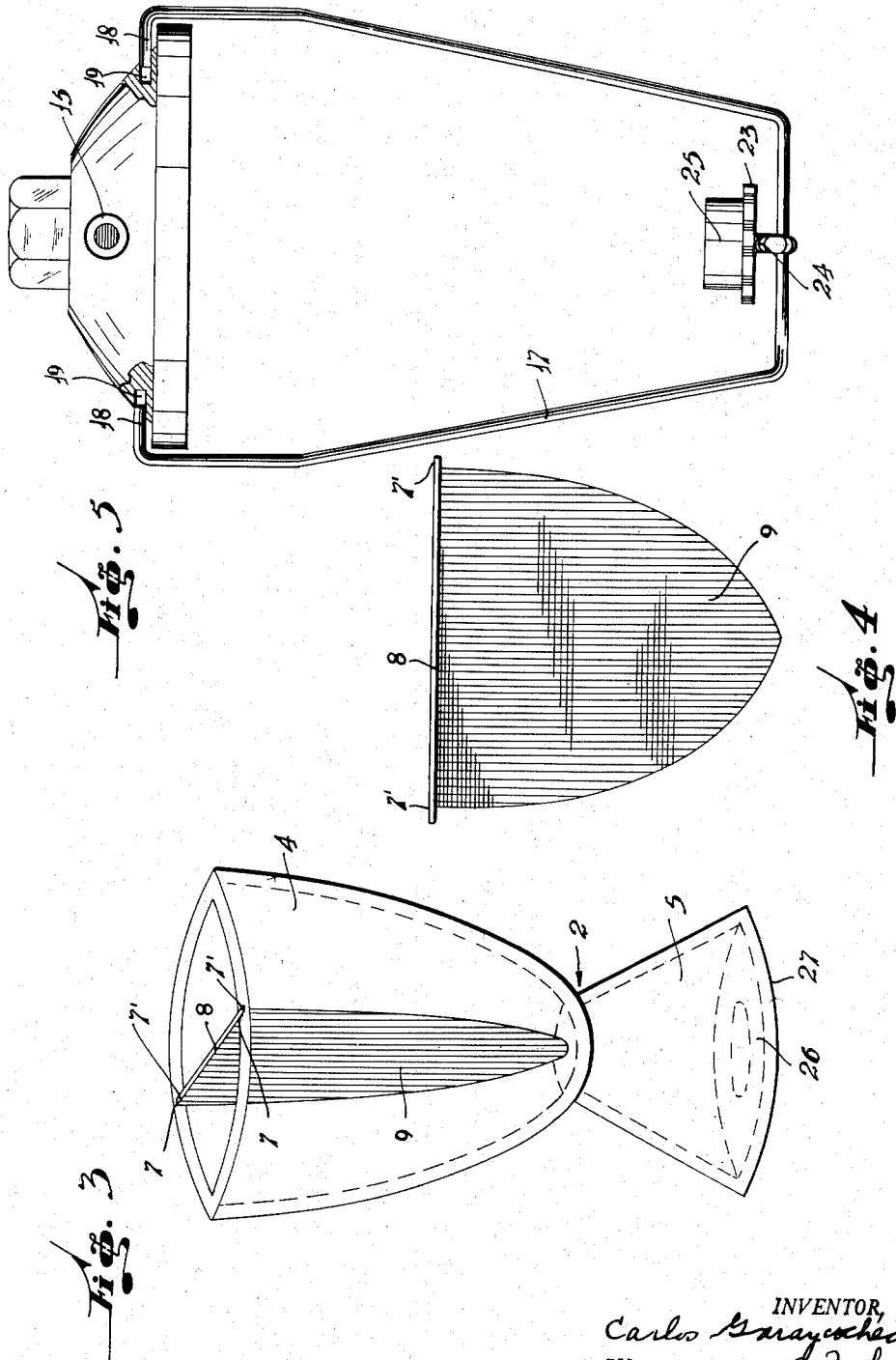

2,656,926

UNITED STATES PATENT OFFICE 2,656,926

DEVICE FOR SEPARATING WATER AND FOREIGN MATTER FROM LIQUID FUEL

Carlos Garaycochea, Buenos Aires, Argentina

Application October 26, 1951, Serial No. 253,312
In Argentina October 30, 1950

4 Claims. (Cl. 210—57).

The present invention relates to liquid separators and more particularly to a device for separating water and foreign matter from fuel for internal combustion engines.

At the present time a number of types of filter are known which are used for separating from fuel intended to be fed to internal combustion engines such foreign bodies as may be suspended therein, but such known filters are provided with a gauze, generally a metal gauze, through which the fuel is compelled to pass. If the mesh of the gauze is very fine, passage of the fuel sometimes causes clogging of the mesh, and is nearly always difficult so that it may happen that a quantity of fuel is fed to the engine which is insufficient for the engine requirements. On the other hand, if the mesh is coarse, it may allow certain foreign bodies to pass which ought to be stopped.

The principal object of the present invention is, therefore, to provide a new type of liquid separator which shall overcome the drawbacks of known types, and shall solve the problems with which the separator industry is faced.

Another object of the present invention is to provide a separator which shall permit foreign matter and water which may be contained in the fuel to settle at the bottom of the vessel constituting the filter housing, and shall allow the fuel to pass untrammeled to the carburetor at all times even when a metallic gauze is used in the device as will hereinafter be explained.

Another object of the present invention is to provide a separator device which shall be easy and cheap to manufacture, and shall be capable of being installed without difficulty.

These and other objects of the present invention will become apparent in the course of the detailed description of a preferred embodiment thereof illustrated by way of example in the accompanying drawings.

In the drawings:

Figure 3 is a perspective view illustrating the shape of the receptacle with its vertical partition, for completing an embodiment such as that shown in Figures 1 and 2.

Figure 4 is a front elevation of a partition forming part of the embodiment of the present invention shown in Figures 1 and 2, and Figure 5 is an elevation of a cover provided with retention means suitable for connecting the same to a receptacle of the type shown in Figure 3, and said cover also forming part of an embodiment of the device as illustrated in Figures 1 and 2.

Figure 1:
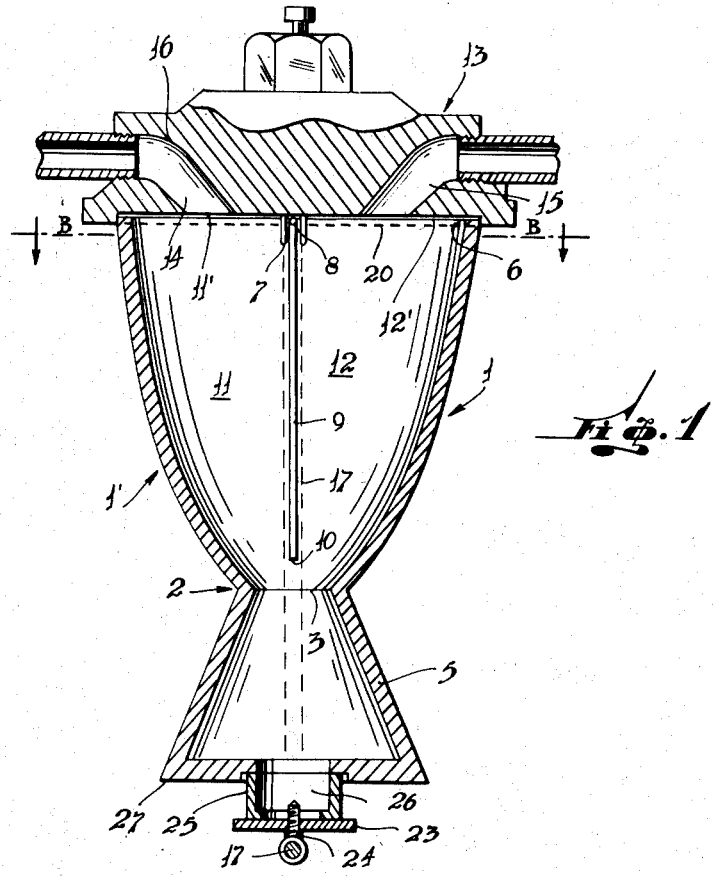
Figure 1 is a part sectional elevation, the section being taken on the line A—A of Figure 2, showing the relative arrangement of the parts constituting the device.
Figure 2:
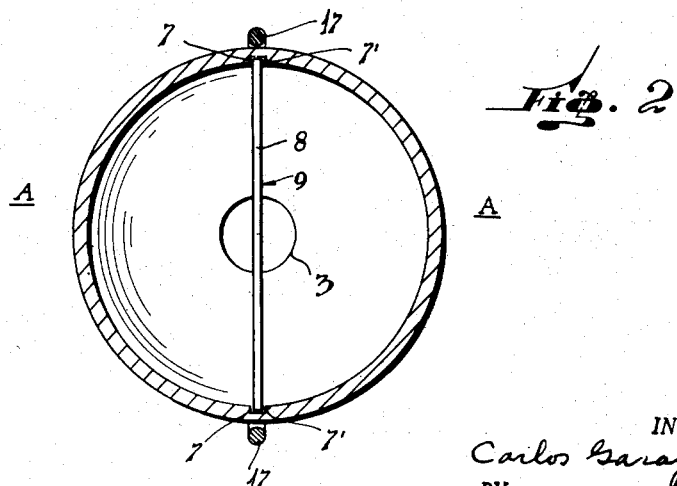
Figure 2 is a plan view partly in section on the line B—B of Figure 1.

Referring to the drawings, I provide a receptacle or vessel indicated by the general reference numeral 1 and preferably made of glass said vessel being shaped with a constriction 2, defining an internal orifice 3, establishing communication between an open end (upper) portion 4 of the receptacle, and a lower closed end portion 5 thereof, both of which portions flare outwardly from the constriction 2. The upper portion 4 of receptacle 1 is open at its end remote from the constriction to define a mouth 6 which has oppositely disposed notches 7 in which are received the ends 7' of a rod 8 constituting mounting means for and connected to a partition member 9 shaped so that its edges fit closely against the inner surface of the upper portion 4 of receptacle 1, as illustrated in Figures 3 and 4. Said partition 9 defines inside the upper portion 4 of receptacle 1, two chambers 11 and 12 which at the upper end thereof each define an aperture 11', 12', respectively. The mouth of the vessel 1, is adapted to be closed by a cover 13 provided with a liquid feeder or inlet duct 14, communicating with inlet chamber 11, and a liquid outlet duct 15, communicating with outlet chamber 12. The liquid feeder duct 14 has an elbow 16 defining a substantially obtuse angle. Articulated to the cover 13, is a cover retention means comprising a stirrup member 17 (see Fig. 5) swingably connected to said cover by in-turned ends 18, engaging respective holes 19. Said stirrup enables the cover 13 to be secured in position on the receptacle 1, for which purpose said cover is provided with an annular outstanding flange 20, to overlap the mouth of the receptacle 1, between the end of which and said cover 13 a resilient washer or packing 21 may conveniently be located. For the purpose of urging the cover towards the mouth of the receptacle 1 when the cover is in position thereon, I provide on the cross bar of the stirrup member 17, a screw-threaded pin 24 on which is screwed a nut member 23 supporting on the side thereof remote from said cross bar a hollow stop member 25, adapted to engage a recess 26, provided on the outer face of the floor or closed end 27 of the receptacle 1. With the parts in the assembled position shown in Figure 1, it will be clear that by rotating the nut 23 I may increase or decrease the pressure of the cover member 13 on the receptacle, and may even so far retract the stop member 25 as to disengage it from the recess 26, thereby enabling the stirrup to be swung clear of the lower portion 5 of receptacle 1, whereupon the cover 13 may be removed, or alternatively, the receptacle may be taken away from the cover.

If the device be assembled as shown in Figure 1, and also connected at the liquid feeder duct 14 to a source of fuel such as a gasoline feed pump, and with the outlet duct 15 connected to the carburetor of an internal combustion engine working on gasoline, fuel will be fed by the ordinary action of the feed pump, into chamber 11 and a portion of the entering fuel will be directed against the partition 9. Any particles suspended in the fuel will lose velocity and tend to precipitate in the bottom or lower portion 5 of the receptacle 1, or else adhere to the partition 9 until a sufficient quantity has gathered there for it to fall off and drop into said bottom portion 5. The gasoline passes underneath the free end 10 of the partition, and the water separates out and falls into the lower portion 5 of the receptacle, whereas the gasoline passes into chamber 12 from which it is expelled to and through the duct 15 by fresh quantities of incoming fuel. If the partition 9 is a metallic gauze or a foraminous sheet, part of the fuel striking the partition 9 on emerging from the duct 16 will pass through such gauze or perforate partition 9, in which event the device will act with even greater efficiency because the absence of a current of liquid passing below the free end 10 of the partition 9 will facilitate the precipitation of suspended matter and its passage into the lower portion 5.

For cleaning purposes, it is sufficient to dismantle the device by turning the nut 23 to retract the stop member 25, as hereinabove explained, a sufficient distance to allow the receptacle 1 to be removed.

Although I have hereinabove described the present invention with particular reference to a preferred embodiment thereof, I do not intend to be limited thereby, but it is to be understood that I may make all such changes and modifications therein as lie within the scope of the accompanying claims.

I claim:

1. In a device for separating water and foreign matter from liquid fuel, a receptacle provided with a constricted portion defining an upper compartment and a lower compartment, there being an orifice providing communication between said upper and lower compartments, the end of said upper compartment remote from said orifice being open to define a mouth, there being a pair of diametrically opposed notches in said mouth, a rod having its end seated in said notches, a partition connected to said rod and extending into said upper compartment and having its side edges arcuate and snugly engaging the inner surface of the receptacle, said partition defining a first and second chamber with said upper compartment, and a cover mounted on the upper end of said receptacle, there being a first duct in said cover for supplying liquid to one of said chambers, there being a second duct communicating with the other of said chambers for the egress therethrough of liquid.

2. In a device for separating water and foreign matter from liquid fuel, a receptacle provided with a constricted portion defining an upper compartment and a lower compartment, there being an orifice providing communication between said upper and lower compartments, the end of said upper compartment remote from said orifice being open to define a mouth, there being a pair of diametrically opposed notches in said mouth, a rod having its end seated in said notches, a partition connected to said rod and extending into said upper compartment and having its side edges arcuate and snugly engaging the inner surface of the receptacle, said partition defining a first and second chamber with said upper compartment, and a cover mounted on the upper end of said receptacle, there being a first duct in said cover for supplying liquid to one of said chambers, there being a second duct communicating with the other of said chambers for the egress therethrough of liquid, said first duct including a bend defining a substantially obtuse angle, said partition being foraminous.

3. In a device for separating water and foreign matter from liquid fuel, a receptacle provided with a constricted portion defining an upper compartment and a lower compartment, there being an orifice providing communication between said upper and lower compartments, the end of said upper compartment remote from said orifice being open to define a mouth, there being a pair of diametrically opposed notches in said mouth, a rod having its end seated in said notches, a partition connected to said rod and extending into said upper compartment and having its side edges arcuate and snugly engaging the inner surface of the receptacle, said partition defining a first and second chamber with said upper compartment, a cover mounted on the upper end of said receptacle, there being a first duct in said cover for supplying liquid to one of said chambers, there being a second duct communicating with the other of said chambers for the egress therethrough of liquid, said first duct including a bend defining a substantially obtuse angle, said partition being foraminous, said cover having an annular flange surrounding the mouth of said receptacle, and means for retaining said cover on said receptacle.

4. The apparatus defined in claim 3 wherein said last-named means comprises a stirrup having a pair of inturned opposed ends, there being a pair of openings in said cover for receiving said ends, the lower portion of said stirrup defining a crossbar, there being a recess in the bottom of said receptacle, a hollow stop member extending into said recess, and a pin extending from said crossbar and arranged in engagement with said stop member.

CARLOS GARAYCOCHEA.

References Cited in the file of this patent

UNITED STATES PATENTS

| Number | Name | Date |
| --- | --- | --- |
| 723,556 | Stewart | Mar. 24, 1903 |
| 734,812 | Bush | July 28, 1903 |
| 952,620 | Keyes | Mar. 22, 1910 |
| 1,087,692 | Short | Feb. 17, 1914 |
| 1,682,939 | Schwab et al. | Sept. 4, 1928 |
| 1,714,300 | Denney | May 21, 1929 |
| 2,050,091 | Gibson et al. | Aug. 4, 1936 |
| 2,446,587 | Henry | Aug. 10, 1948 |
| 2,465,021 | Kennison et al. | Mar. 22, 1949 |

FOREIGN PATENTS

| Number | Country | Date |
| --- | --- | --- |
| 196,118 | Great Britain | Apr. 19, 1923 |